(No Model.) 4 Sheets—Sheet 1.
F. H. NIERMANN.
MACHINE FOR CUTTING IRREGULAR SHAPES.
No. 443,535. Patented Dec. 30, 1890.
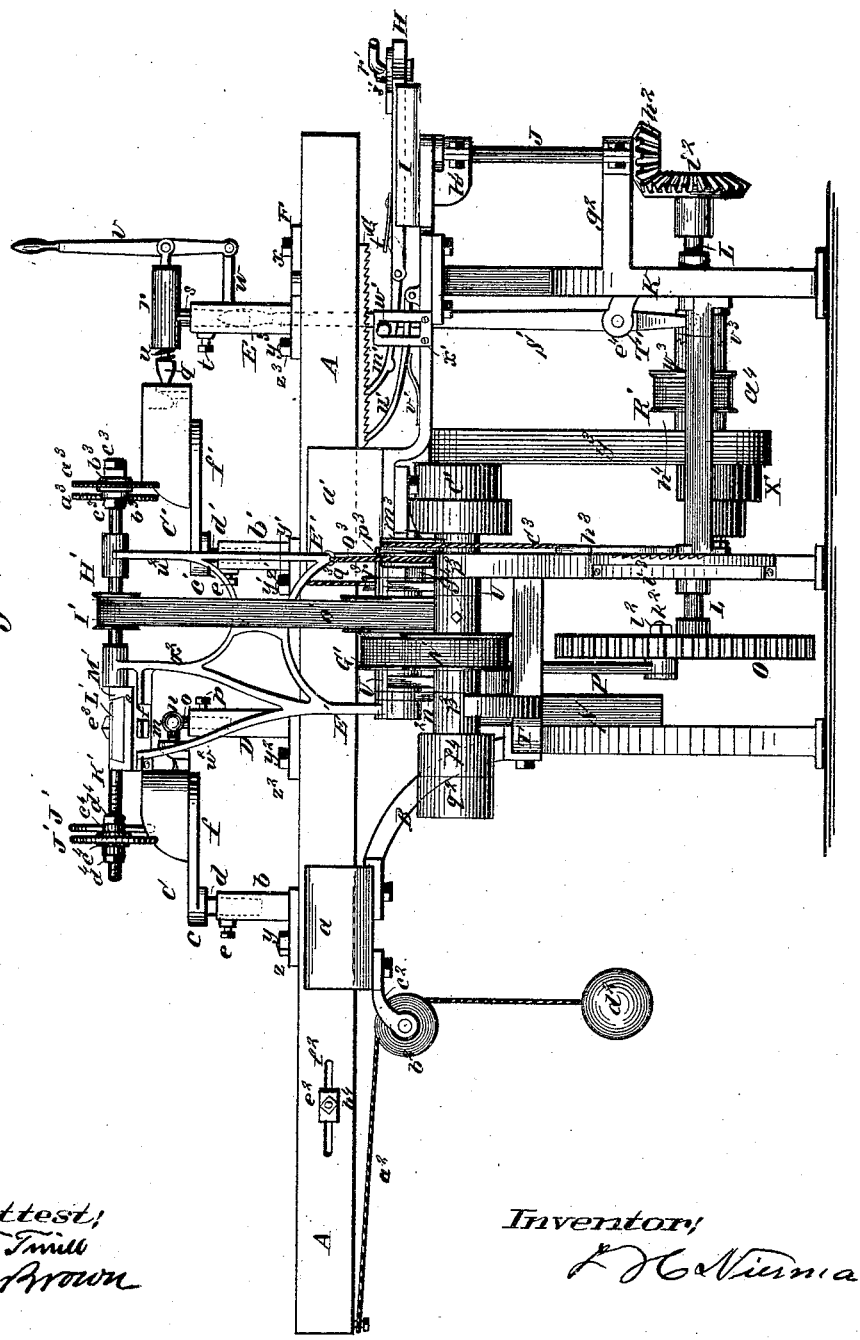

(No Model.) 4 Sheets—Sheet 2.
F. H. NIERMANN.
MACHINE FOR CUTTING IRREGULAR SHAPES.
No. 443,535. Patented Dec. 30, 1890.
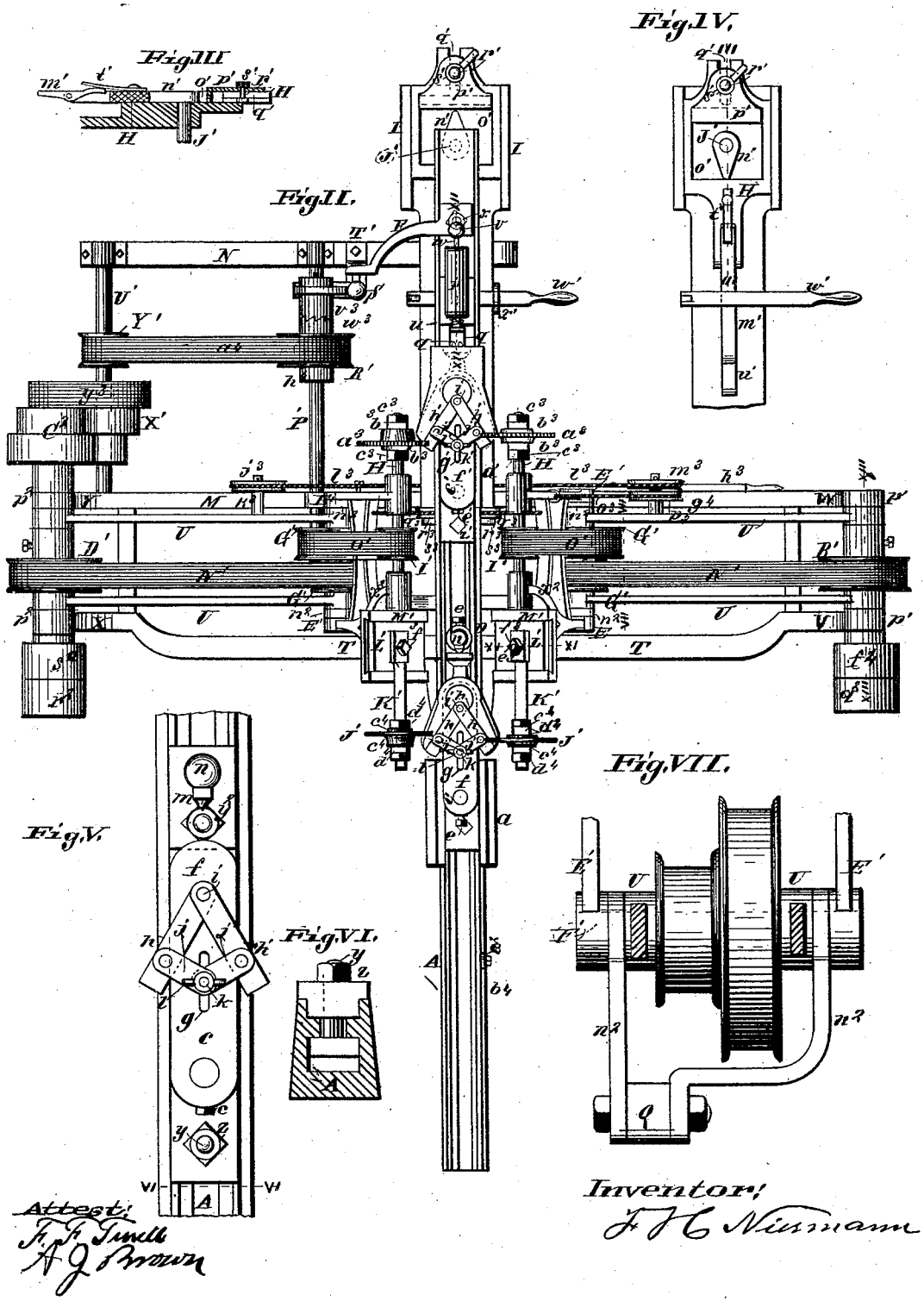

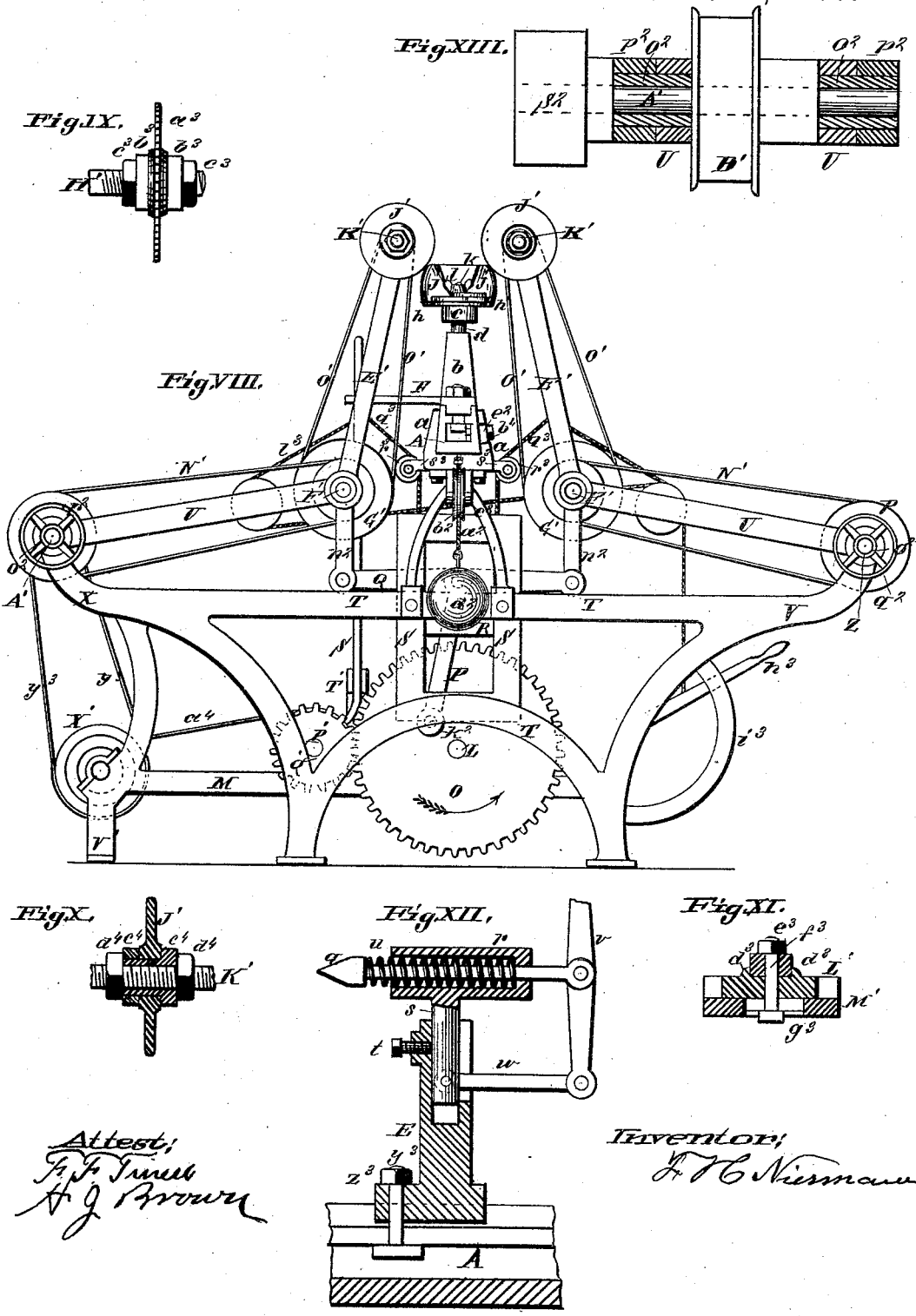

(No Model.) 4 Sheets—Sheet 4.
F. H. NIERMANN.
MACHINE FOR CUTTING IRREGULAR SHAPES.
No. 443,535. Patented Dec. 30, 1890.
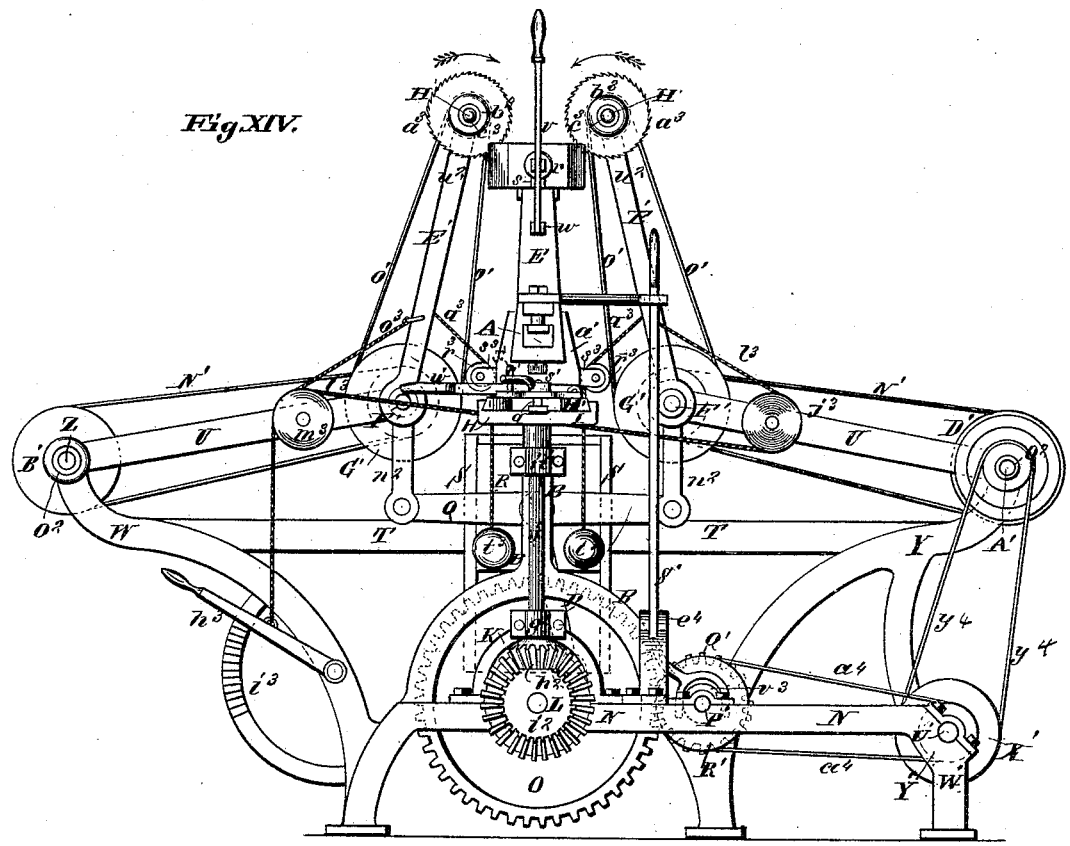
Fig. XIV.
Fig. XV. Fig. XVI.
Fig. XVII.
Fig. XVIII. Fig. XIX.
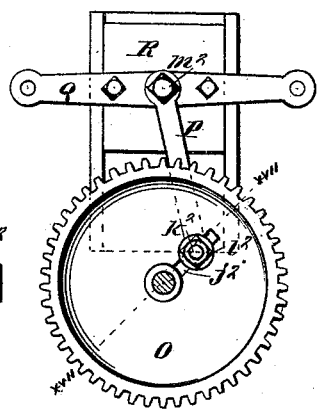
Attest:
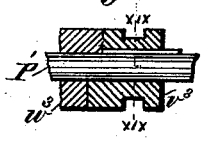
Inventor:
F. H. Niermann

UNITED STATES PATENT OFFICE.

FRANZ H. NIERMANN, OF JEFFERSON, MISSOURI.

MACHINE FOR CUTTING IRREGULAR SHAPES.

SPECIFICATION forming part of Letters Patent No. 443,535, dated December 30, 1890.

Application filed March 7, 1890. Serial No. 343,214. (No model.)

*To all whom it may concern:*

Be it known that I, FRANZ H. NIERMANN, a citizen of the United States, residing in the city of Jefferson, in the county of Cole and State of Missouri, have invented a new and useful Machine for Cutting Irregular Shapes, especially Saddle-Trees; and I do hereby declare the following to be a full, clear, and exact description of my invention, which will enable others skilled in the art to which it appertains to make, construct, and use the same, reference being had to the accompanying drawings, and to the letters of reference marked thereon, which form part of this specification.

The object of my invention is to provide mechanism by means of which material while held stationary may be shaped like a pattern and also held stationary in the machine by the direct action of a cutting-tool moved up and down across the material, the action of the cutting-tool being controlled by a form-wheel also moved up and down across the pattern. Heretofore material has been shaped like patterns by bringing the surface of the material and pattern to the cutting-tool and the form-wheel, respectively, by revolving the material and pattern in a turning-lathe, and the forms that could be reproduced by this method have been necessarily limited. By my invention, the material being stationary and the cutting-tool moved to meet the surface to be shaped, a greater variety of forms can be reproduced than can be when the material is revolved to bring the surface to be shaped in contact with the cutting-tool and the work more satisfactorily done. Patterns in connection with form-wheels have been heretofore used in turning-lathes to control cutting-tools to shape material after the patterns, and I do not, therefore, claim that broadly. I attain this object by the mechanism illustrated in the accompanying drawings, in which—

Figure I is a side elevation. Fig. II is a plan view. Fig. III is a vertical section on line III III of Fig. IV. Fig. IV is a detailed top view of the feed-slide and dogs. Fig. V is an enlarged view of chuck and adjustable bar. Fig. VI is a vertical transverse section on line VI VI of Fig. V. Fig. VII is a vertical section on line VII VII of Fig. II, showing connection between cross-bar and reciprocating frame. Fig. VIII is a view of the left-hand end of the machine. Fig. IX is an enlarged detailed view of the cutting-tool. Fig. X is an enlarged section of form-wheel. Fig. XI is an enlarged section of line XI XI of Fig. II, showing manner of adjusting form-wheel spindle. Fig. XII is an enlarged vertical section on line XII XII of Fig. II, showing the movable center with its spring in the head and connections for moving the center in the head, the means of adjusting the head in the standard, and the standard on the shears. Fig. XIII is an enlarged vertical section on line XIII XIII of Fig. II, showing bearing of swinging frame and manner of driving pulley. Fig. XIV is a view of the right-hand end of the machine. Fig. XV is a detailed top view of slide with its cross-bar and connections of cross-bar with disk-wheel. Fig. XVI is a vertical section on line XVI XVI of Fig. XV. Fig. XVII is a section on line XVII XVII of Fig. XVI, showing adjustable connection of pitman with disk-wheel. Fig. XVIII is a vertical longitudinal section on line XVIII XVIII of Fig. XIX, showing manner of clutch. Fig. XIX is a vertical horizontal section on line XIX XIX of Fig. XVIII, showing manner of engagement of forked lever with clutch.

Similar letters refer to corresponding parts in all figures.

A are shears dovetailed in guides $a\ a'$, secured on the tops of the main standards B of the main frame. Adjustable on the shears A are chucks C C', having standards $b\ b'$, with heads $c\ c'$, having shanks $d\ d'$, which pass into the standards $b\ b'$ and are adjustable therein by means of the set-screws $e\ e'$, and secured on the heads $c\ c'$ are bases $f\ f'$, with slots $g\ g'$, all as shown in Figs. I, II, and V.

Mounted on the bases $f\ f'$ in any suitable manner are different suitable devices for holding the patterns and material to be shaped. As a device specially adapted for shaping saddle-trees, the drawings show, mounted on the bases $f\ f'$, side bars $h\ h'$, having their ends pivoted together and to the bases by the pivots $i\ i'$ and adjustable on the bases by means of the toggles $j\ j'$, of the bolts $k\ k'$, which pass through the toggles and slots $g\ g'$ in the bases, and of the thumb-nuts $l\ l'$, as shown in Fig. V.

D is a standard having a center $m$ fixed in a head $n$, having a shank $o$ passing into the standard D, the head being adjustable in the standard D by means of the set-screw $p$, and E is a standard having a movable center $q$ passing through a counterbored head $r$, having a shank $s$ passing into the standard E and adjustable therein by means of the set-screw $t$. The center $q$, which has a head the base of which is larger in diameter than the shank of the center, forms a shoulder on the center where the head and shank meet, is movable horizontally in the head $r$, and the shank of center $q$ is surrounded by a spiral spring $u$, one end of which spring bears against the shoulder in the head $r$ and the other against the shoulder on center $q$. The center $q$ is held against the material by the spiral spring $u$, and is operated to release the material by means of the lever $v$, pivoted to the outer end of the center $q$ and having the link-connection $w$ with the lower part of the adjustable head $r$, all as shown in Figs. I, II, and XII.

F is a stop projecting over the shears and adjustable thereon by means of the clamp-nut $x$, as shown in Figs. I and II. The chucks C and C' are adjustable on the shears by means of the clamp-screws $y$ $y'$ and the clamp-nuts $z$ $z'$, and the standards D and E are adjustable on the shears by means of the clamp-screws $y^2$ $y^3$ and the clamp-nuts $z^2$ $z^3$, as shown in Figs. I and VI.

On the under side of the shears A is a rack G, operated to move the shears by a dog $m'$, pivoted to a slide H, operated by a cam $n'$ in the recess $o'$ in the slide H, which slide has on its outer end the plate $p'$ to regulate the action of the cam on the slide H, and it is adjustable in the slot $q'$ in the outer end of the slide H by means of the clamp-screw $r'$ and the clamp-nut $s'$, the dog $m'$ being held in place by the spring $t'$ on the slide H. The slide H moves in a guide I, to which is pivoted the retaining-dog $u'$, held in place by means of a spring $v'$, secured on the guide I. The dogs $m'$ and $u'$ are adapted to be thrown out of engagement by means of a lever $w'$, secured to the rear side of the guide I in any suitable manner that will permit it being pressed downward upon the dog $m'$, which dog then presses down the retaining-dog $u'$, over which it works, thus throwing both dogs out of engagement to permit the shears to be returned to the cam end of the machine, and on the front side of the guide I is secured a yoke $x'$ to guide the lever $w'$, all as shown in Figs. I, III, and IV.

To the other end of the shears from the cam is secured one end of the cord $a^2$, which passes over the sheave $b^2$, guided in the bracket $c^2$, secured to the guide $a$, and on the pendent end of the cord $a^2$ is the weight $d^2$, which is sufficiently heavy to keep the rack in place against the dogs $m'$ and $u'$ and to return the shears back through the guides $a$ $a'$ to the cam end of the machine, when the dogs $m'$ and $u'$ are thrown out of engagement by the lever $w'$, which return is arrested by the stop $e^2$, which is adjustable in the slot $f^2$ in the side of the shears by means of the clamp-screw and nut $b^4$, for the purpose of enabling the return to be arrested at the desired point, all as shown in Fig. I. The sheave $b^2$ for the cord $a^2$ should be bracketed such a distance from the end of the shears to which the cord is secured toward the cam end of the machine and the cord should be of such length as to enable the weight $d^2$, acting on the cord $a^2$ when the dogs $m'$ and $u'$ are thrown out of engagement, to return the shears to and to allow them when operated by the dogs in engagement to recede from the cam end of the machine the necessary and proper distance.

J is a vertical shaft journaled in a bracket $h^4$ on the under side of the guide I and in the arm $g^2$, secured on standard K. The upper end of shaft J passes through the guide I and has on its upper end the cam $n'$, which the shaft J revolves in the recess $o'$ of the slide H to operate that slide, as shown in Figs. II and III. At the lower end of shaft J is the bevel-pinion $h^2$, meshing into the bevel-wheel $i^2$, secured on the horizontal shaft L, which is journaled on the cross-bars M and N of the main frame. On the inner end of shaft L is the disk-wheel O, having therein the slot $j^2$. To the disk-wheel O is pivoted the lower end of a pitman P by means of the wrist-pin $k^2$, which passes through the slot $j^2$ and is adjustable therein by means of the clamp-nut $l^2$. The upper end of the pitman P is pivoted by a wrist-pin $m^2$ to the cross-bar Q, which is secured to the slide R, moving vertically in the guide S, which is secured to the inner side of the cross-bar T of the main frame, all as shown in Figs. I, VIII, XIV, XV, XVI, and XVII.

To each end of the cross-bar Q are pivoted the lower ends of links $n^2$, the upper ends of which are pivoted to the inner ends of the horizontal pivoted frames U, as shown in Figs. VII, VIII, XIV, and I. The pitman P has a radial movement from the cross-bar Q. The outer ends of the horizontal frames U turn on bushings $o^2$, fixed in bearings $p^2$ on front standards V and W and on rear standards X and Y of the main frame, and the shaft Z is journaled in the bushings $o^2$ on front standards V and W, and the shaft A' is journaled in the bushings $o^2$ on rear standards X and Y, as shown in Figs. VIII and XIV. The shaft Z carries on its outer end the loose driving-pulley $q^2$ and the fixed driving-pulley $f^4$ and between the bushings $o^2$ the fixed flange-pulley B'. The shaft A' carries on its outer end the loose driving-pulley $r^2$ and the fixed driving-pulley $s^2$, and on its other end the fixed cone-pulley $C^2$, and between the inner ends of the bushings $o^2$ the fixed flange-pulley D', as shown in Figs. XIII and II. The inner ends of the horizontal frames U are pivoted to the lower ends of the vertical frames E' and also to the upper ends of the links $n^2$ by the shafts F', which carry the loose flange cone-pulleys G', as shown in Figs. VIII, VII, and XIV.

In the upper ends of standards $u^2$ and standards $x^2$ of the vertical frames E' are journaled shafts H', which carry between the standards $u^2$ and $x^2$ the fixed pulleys I', and on their outer ends the cutting-tools $a^3$, held adjustably thereon by means of adjustable collars $b^3$ and jam-nuts $c^3$, as shown in Figs. I, II, and IX. The form-wheels J' turn on spindles K', having squared ends, by which they are secured to the slides L' between the lugs $d^3$ on the tops of the slides L'. The form-wheels are adjustable on the spindles by means of adjustable collars $c^4$ and jam-nuts $d^4$, as shown in Figs. I, X, and VI. The slides L' move horizontally in guides M', secured in the upper ends of standards $w^2$ and to the sides of standards $x^2$ of the vertical frames, and are adjustable to and from the pattern-chuck C in the guides M' by means of clamp-nuts $e^3$ and clamp-screws $f^3$, which pass through the longitudinal slots $g^3$ on the guides M', through the slides L', and through the ends of the form-wheel spindles K', secured to the slides L', Figs. I and XI. The standards $w^2$ of the vertical frames are shorter than the standards $u^2$ and $x^2$ of those frames, in order that the spindles K', when the slides L' are in place in the guides M', may be in the same horizontal planes as the shafts H', which carry the cutting-tools, Fig. I. The form-wheels and cutting-tools, which are of the same diameter when an exact reproduction of the pattern is desired, are not in the same vertical planes, respectively, but are so adjusted as to pass each other over the top of the pattern and material, respectively, and their relative positions on the vertical frames is such that one form-wheel will rest against each side of the pattern and one cutting-tool against each side of the material when the vertical frames are in engagement and the pattern and material in place, Figs. I and II. The flange-pulley B' on shaft Z and the flange-pulley D' on shaft A' are connected with a loose flange cone-pulley G' on shafts F' by belts N', and flange cone-pulleys G' are connected with fixed flange-pulleys I' on shafts H' by belts O', Figs. I, II, and VIII. The vertical frames are so pivoted to the horizontal frames that they incline at a small angle toward the chucks and centers when in engagement, Figs. VIII and XIV, and the distance to which the form-wheels and cutting-tool will be lowered and raised by the vertical frames is regulated by the adjustment of the pitman P in the slot $j^2$ in the disk-wheel O, Figs. VIII, XIV, and XVI.

To the side of the standard W is pivoted the lever $h^3$, and secured to standard W is the quadrant-rack $i^3$, for holding the lever $h^3$ in engagement, Fig. XIV.

The sheave $j^3$ is journaled on a stud $k^3$, secured on the rear horizontal frame U, and to the rear vertical frame at a suitable height is secured in any suitable manner a cord $l^3$, which passes back over the sheave $j^3$, and then to the front of the machine and over the sheave $m^3$, journaled on a stud $g^4$, secured on the front horizontal frame U, and then down to the lever $h^3$, to which it is secured in any suitable manner at a suitable distance from the pivoted end of that lever.

To the vertical frame in the front of the machine is secured at a suitable height in any suitable manner a cord $o^3$, which passes forward over the sheave $p^3$, journaled on the stud $g^4$, secured on the front horizontal frame U, and then down to the lever $h^3$, to which it is secured, as was cord $l^3$, Figs. II and XIV. The cords $l^3$ and $o^3$ are of such length and so secured to lever $h^3$ that when lever $h^3$ is forced down it will operate both cords at about the same time and cause them to swing the vertical frames forward and backward clear of the chucks and centers. To the vertical frames E' are secured in any suitable manner cords $q^3$, which pass over sheaves $r^3$, turning in brackets $s^3$, secured to the under side of guide $a'$, so that one of the brackets faces to the front and the other to the rear of the machine, and to the pendent ends of the cords $q^3$ are secured balance-weights $t^3$ at such distance from the brackets $s^3$ that when the vertical frames are thrown out of engagement by the lever $h^3$ they will be prevented from dropping out too far by the balance-weights $t^3$ coming in contact with the brackets $s^3$. The balance-weights $t^3$ are heavy enough to draw the vertical frames back into engagement when the lever $h^3$ is released from the quadrant-rack $i^3$ and to hold them there while the work is being done, Figs. VIII and XIV.

In the rear of the machine is the shaft P', journaled on cross-bars M and N of the main frame, having secured on its inner end the geared pinion Q', Figs. VIII and XIV, and on shaft P', between cross-bars M and N, is a clutch $v^3$, which slides on a feather, and a clutch-pulley R', having the face $w^3$ to engage the clutch $v^3$, turning loose on the shaft P' and held in place by the collar $h^4$, Fig. II. A lever S' is engaged in a groove in the clutch $v^3$ and is pivoted to move laterally by pivot $e^4$ to a standard T', secured to the cross-bar N of the main frame, and the lever S' passes up above the shears, so that the stop F may come in contact with it when the work has passed under the cutting-tools to the end of the pattern, or as far as may be desired, to throw the clutch $v^3$ out of engagement and to enable the operator to put the clutch $v^3$ into engagement by moving lever S' with his hand.

The shaft U' is journaled on the rear standards V' and W' of the main frame and carries fixed pulley Y' and fixed cone-pulley X'. The cone-pulley X' is connected with cone-pulley $C^2$ on the shaft A' by a belt $y^4$, and flange-pulley Y' with clutch-pulley R' on shaft P' by the belt $a^4$, Figs. II, VIII, and XIV. A driving-belt on driving-pulley $s^2$ drives shaft A', with cone-pulley $C^2$, causing belts $y^4$ and $a^4$ to operate the feed mechanism and the mechanism for moving the form-wheels and cutting-tools on the vertical frames up and down across the pattern and material, and also revolves the form-wheel and cutting-tool on the rear vertical frame, and a driving-belt on driving-pulley $f^4$ drives shaft Z and revolves the form-wheel and cutting-tool on the front vertical frame. Pinion $h^2$ may be half the circumference of bevel-wheel $i^2$, as shown in the drawings, when the cam will revolve twice while the form-wheels and cutting-tools are traveling up and back again, or it may be the same size of the bevel-wheel, when it will make but one revolution while the form-wheels and cutting-tools are traveling up and back.

To use my machine the vertical frames E' are thrown away from the chucks C C' and the centers $m$ and $q$ by forcing down lever $h^3$ and engaging it in the quadrant-rack $i^3$. The chucks and standards carrying the centers are loosened on the shears. The pattern is secured on the base $f$ of chuck C and the material on the base $f'$ of chuck C' by suitable devices. Chuck C' is adjusted on the shears conveniently for the work to be done and clamped. The movable center $q$ is then forced into the material, so that it will be held firmly in position by spiral spring $u$, and clamped on the shears. The shears A are then adjusted so that the cutting-tools $a^3$ will be in position to commence work when adjusted by means of lever $w'$, the hand, and the stop $e^2$, and clamped by clamp-screw and nut $b^4$. The pattern-chuck is then adjusted on the shears so that the pattern will be between the form-wheel spindles and clamped. The center $m$ is then forced against the end of the pattern by means of its standard D, which is then clamped. The set-screws $e$, $e'$, $p$, and $t$ are then tightened. The form-wheels J are then adjusted on their spindles K', so that they will commence traversing the pattern in the right place, and clamped. The stop F is then adjusted to throw the clutch out of engagement when the work is done and clamped. The plate $p$ is then adjusted to regulate the speed of the shears and clamped. The shears are returned to stop $e^2$, the lever $h^3$ released from the rack $i^3$, and the vertical frames brought into engagement by the weights $q^3$. The driving-belts are connected with pulleys $s^2$ and $f^4$ and the clutch brought into engagement with the hand, and the machine is then in operation and the work commenced. Belts N' and O' drive the cutting-tools, and belts $y^4$ and $a^4$ clutch pulley R' when out of engagement as a loose pulley, but when in engagement as a fixed pulley it operates the mechanism which operates the feed and vertical frames. The vertical frames move the form-wheels and cutting-tools up and down across the pattern and material, and the shears, moved by the feed device, carry the pattern and material from one end to the other under the form-wheels and cutting-tools, respectively, and the form-wheels are thus enabled to traverse the whole surface of the pattern and to control the cutting-tools, following them over the material to shape the material after the pattern. When only one form-wheel and cutting-tool is required, one vertical frame may be thrown out of engagement with the hand. When the work has passed beneath the cutting-tools to the end of the pattern, or as far as may be desired, the lever S' comes in contact with stop F, which throws the clutch out of engagement. The shears are then returned and the work again passed under the cutting-tools when necessary, and this is repeated until the material has been shaped according to the pattern. The work can then be removed by throwing the vertical frames out of engagement and loosening the device, securing it to the base and drawing away center $q$ by means of lever $v$, and the pattern by releasing it from the base $f$ and drawing away center $m$.

Having fully described my invention, what I claim, and desire to secure Letters Patent for, is—

1. The combination of shears, guides for the shears to move in, chucks on the shears having bases on their heads, a fixed center in a head in a standard on the shears, and a movable center having a counterbored head with a shank that passes into a standard on the shears, and mechanism for operating the movable center, consisting of a spring in the counterbored head surrounding the shank of the movable center, a shoulder in the counterbored head, and a shoulder on the movable center for the ends of the spring to bear against, a lever pivoted to the outer end of the movable center, and a link-connection between the lever and the lower part of the counterbored head, all substantially as described.

2. The combination of shears, a rack under the shears, a dog secured to a slide to operate the rack to move the shears and the slide, a spring on the slide to hold the dog in place in the rack, a cam, a recess in the slide for the cam to revolve in to operate the slide, a shaft to revolve the cam, a plate adjustable in a slot in the slide behind the recess for the cam to regulate the action of the cam on the slide, a guide for the slide to move in, a retaining-dog on the guide, a spring on the guide to hold the retaining-dog in place in the rack, a cord secured to the other end of the shears from the cam, a sheave for the cord, a guide for the sheave, and a weight on the pendent end of the cord, all substantially as described.

3. The combination of shaft L, disk-wheel O, pitman P, wrist-pins $k^2$ and $m^2$, cross-bar Q, slide R, guide S, links $n^2$, horizontal frames U, vertical frames E', shafts F', pulleys G', shafts Z and A', bushings $o^2$, pulleys B' and D', shafts H', pulleys I', and belts N' and O', all substantially as described.

4. The combination of shaft L, disk-wheel O, pitman P, wrist-pins $k^2$ and $m^2$, cross-bar Q, slide R, guide S, links $n^2$, horizontal frames U, vertical frames E', shafts F', shafts Z and A', bushings $o^2$, cords $q^3$, sheaves $r^3$, guides $s^3$, and weights $t^3$, all substantially as described.

5. The combination of shaft P', clutch $v^3$, clutch-pulley R', lever S', engaging the clutch, pivot $e^4$, the stop F, geared pinion Q', shaft L, disk-wheel O, pitman P, wrist-pins $k^2$ and $m^2$, cross-bar Q, slide R, guide S, links $n^2$, horizontal frames U, vertical frames E', shaft F', cone-pulleys G', shafts Z and A', bushings $o^2$, pulleys B' and D', shafts H', fixed pulleys I', spindles K', slides L', guides M', belts N' and O', fixed cone-pulley $C^2$, shaft U', fixed cone-pulley X', fixed pulley Y', and belts $y^4$ and $a^4$, all substantially as described.

6. The combination of the shaft L, disk-wheel O, pitman P, wrist-pins $k^2$ and $m^2$, cross-bar Q, slide R, guide S, links $n^2$, horizontal frames U, vertical frames E', shafts F', bushings $o^2$, and shafts Z and A', all substantially as described.

7. The combination of shaft P', clutch $v^3$, clutch-pulley R', having face $w^3$, lever S', pivot $e^4$, stop F, geared pinion Q', shaft L, disk-wheel O, pitman P, wrist-pins $k^2$ and $m^2$, cross-bar Q, slide R, guide S, links $n^2$, horizontal frames U, vertical frames E', shafts F', loose cone-pulleys G', shafts Z and A', bushings $o^2$, fixed pulleys B' and D', shafts H', fixed pulleys I', belts N' and O', fixed pulley $C^2$, shaft U', fixed cone-pulley X', fixed pulley Y', belts $y^4$ and $a^4$, bevel-wheel $i^2$, shaft J, pinion $h^2$, cam $n'$, slide H, having recess $o'$, dog $m'$, spring $t'$, guide I, dog $u'$, spring $v'$, rack G, shears A, cord $a^2$, sheave $b^2$, bracket $c^2$, and weight $d^2$, all substantially as described.

8. The combination of the shaft P', clutch $v^3$, clutch-pulley R', lever S', pivot $e^4$, stop F, geared pinion Q', shaft L, disk-wheel O, pitman P, wrist-pins $k^2$ and $m^2$, cross-bar Q, slide R, guide S, links $n^2$, horizontal frames U, vertical frames E', shafts F', loose cone-pulleys G', shafts Z and A', bushings $o^3$, fixed pulleys B' and D', shafts H', fixed pulleys I', cutting-tools $a^3$, adjustable on shaft H', spindles K', form-wheels J', adjustable on spindles K', guides M', with their slots $g^3$, slides L', belts N' and O', fixed cone-pulley $C^2$, shaft U', fixed cone-pulley X', fixed pulley Y', belts $y^4$ and $a^4$, bevel-wheel $i^2$, shaft J, pinion $h^2$, cam $n'$, slide H, recess $o'$ in slide H, dog $m'$, spring $t'$, guide I, dog $u'$, spring $v'$, rack G, shears A, cord $a^2$, sheave $b^2$, bracket $c^2$, and weight $d^2$, all substantially as described.

9. In combination with a center, the bases $f f'$, with their slots $g g'$, the side bars $h h'$, the pivots $i i'$, the toggles $j j'$, the bolts $k k'$, and the thumb-nuts $l l'$, all substantially as described.

10. The combination of a rack, a slide, a dog secured to the slide to operate the rack, a spring on the slide to hold the dog in place in the rack, a cam, a recess in the slide for the cam to revolve in to operate the slide, a shaft to revolve the cam, a guide for the slide to move in, a retaining-dog on the guide, and a spring on the guide to hold the retaining-dog in place in the rack, all substantially as described.

11. The combination of shears, a rack under the shears, a dog secured to a slide to operate the rack to move the shears, the slide, a spring on the slide to hold the dog in place in the rack, a cam, a recess in the slide for the cam to revolve in to operate the slide, a shaft to revolve the cam, a guide for the slide to move in, a retaining-dog on the guide, a spring on the guide to hold the retaining-dog in place in the rack, a lever to throw the dogs out of engagement, suitably secured to the guide, and a yoke on the guide to guide the lever, all substantially as described.

FRANZ H. NIERMANN.

Witnesses:
FRANCIS F. TIRRELL,
ANDREW J. BROWN.